US012020664B2

(12) United States Patent
Kim et al.

(10) Patent No.: US 12,020,664 B2
(45) Date of Patent: Jun. 25, 2024

(54) GAMMA VOLTAGE GENERATING CIRCUIT AND DISPLAY DRIVING DEVICE INCLUDING THE SAME

(71) Applicant: SAMSUNG ELECTRONICS CO., LTD., Suwon-si (KR)

(72) Inventors: Jee Hwal Kim, Seoul (KR); Ki Ho Kong, Suwon-si (KR); In Suk Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/992,266

(22) Filed: Nov. 22, 2022

(65) Prior Publication Data

US 2023/0078111 A1 Mar. 16, 2023

Related U.S. Application Data

(60) Division of application No. 17/391,433, filed on Aug. 2, 2021, now Pat. No. 11,538,433, which is a (Continued)

(30) Foreign Application Priority Data

May 3, 2018 (KR) ........................ 10-2018-0051238

(51) Int. Cl.
*G09G 3/36* (2006.01)
*G09G 3/3258* (2016.01)

(52) U.S. Cl.
CPC ......... *G09G 3/3696* (2013.01); *G09G 3/3258* (2013.01); *G09G 2320/0276* (2013.01); (Continued)

(58) Field of Classification Search
CPC ............... G09G 3/3696; G09G 3/3258; G09G 2320/0276; G09G 2320/0626; G09G 2330/021
See application file for complete search history.

(56) References Cited

U.S. PATENT DOCUMENTS 7,375,710 B2 5/2008 Tobita
9,792,843 B2 10/2017 Chen et al.
(Continued)

FOREIGN PATENT DOCUMENTS

CN 102129847 7/2011
KR 10-2004-0034364 4/2004
(Continued)

OTHER PUBLICATIONS

Korean Office Action dated May 23, 2022 issued in corresponding Korean Appin No. 10-2018-0051238.
(Continued)

*Primary Examiner* — Ariel A Balaoing
(74) *Attorney, Agent, or Firm* — F. Chau & Associates, LLC

(57) ABSTRACT

A gamma voltage generating circuit includes a gamma buffer configured to output a gamma voltage, a first gamma line and a second gamma line providing an output path of the gamma voltage, an output selecting unit configured to connect an output terminal of the gamma buffer to one of the first gamma line and the second gamma line, and an output resistor unit having a first resistor connected to the first gamma line and a second resistor connected to the second gamma line. The second resistor has a resistance value different from that of the first resistor.

6 Claims, 11 Drawing Sheets

Related U.S. Application Data continuation of application No. 16/199,416, filed on Nov. 26, 2018, now Pat. No. 11,127,365.

(52) U.S. Cl.
CPC ............... *G09G 2320/0626* (2013.01); *G09G 2330/021* (2013.01)

(56) References Cited

U.S. PATENT DOCUMENTS

| | | | | |
|---|---|---|---|---|
| 11,127,365 | B2 | 9/2021 | Kim et al. | |
| 2002/0097208 | A1 | 7/2002 | Hashimoto | |
| 2002/0109655 | A1 | 8/2002 | Yer | |
| 2002/0126077 | A1 | 9/2002 | Baek | |
| 2002/0145598 | A1* | 10/2002 | Shen | G09G 3/3696 348/674 |
| 2002/0158862 | A1* | 10/2002 | Chen | G09G 3/3696 345/211 |
| 2003/0151616 | A1 | 8/2003 | Morita | |
| 2004/0075674 | A1 | 4/2004 | Bu | |
| 2004/0233182 | A1* | 11/2004 | Chuang | G09G 3/3611 345/204 |
| 2006/0077491 | A1* | 4/2006 | Morita | H04N 1/407 358/1.9 |
| 2006/0092114 | A1 | 5/2006 | Izumikawa et al. | |
| 2007/0146395 | A1 | 6/2007 | Lee | |
| 2007/0182683 | A1 | 8/2007 | Chin et al. | |
| 2008/0122820 | A1 | 5/2008 | Umeda et al. | |
| 2008/0150874 | A1 | 6/2008 | Kida et al. | |
| 2009/0153593 | A1* | 6/2009 | Lee | G09G 3/3696 345/690 |
| 2010/0127960 | A1 | 5/2010 | Jung et al. | |
| 2010/0225571 | A1 | 9/2010 | Sakariya | |
| 2010/0225678 | A1 | 9/2010 | Kim et al. | |
| 2011/0012882 | A1 | 1/2011 | Jeong | |
| 2011/0032279 | A1 | 2/2011 | Kim et al. | |
| 2011/0050676 | A1 | 3/2011 | Lee | |
| 2011/0074754 | A1 | 3/2011 | Lee et al. | |
| 2011/0175942 | A1 | 7/2011 | Ahn et al. | |
| 2011/0227891 | A1 | 9/2011 | Lee | |
| 2013/0271507 | A1* | 10/2013 | Kim | G09G 3/3291 345/77 |
| 2014/0078189 | A1 | 3/2014 | Chen et al. | |
| 2016/0117992 | A1 | 4/2016 | Park et al. | |
| 2016/0118000 | A1* | 4/2016 | Kim | G09G 3/3696 345/99 |
| 2017/0309219 | A1 | 10/2017 | Kong | |
| 2019/0340996 | A1 | 11/2019 | Kim et al. | |
| 2021/0358448 | A1 | 11/2021 | Kim et al. | |

FOREIGN PATENT DOCUMENTS

| | | |
|---|---|---|
| KR | 10-2006-0037755 | 5/2006 |
| KR | 10-2006-0126052 | 12/2006 |
| KR | 10-2010-0099946 | 9/2010 |
| KR | 10-2011-0024529 | 3/2011 |
| KR | 10-2014-0008017 | 1/2014 |
| TW | 201510975 | 3/2015 |

OTHER PUBLICATIONS

Office Action dated Jan. 24, 2022 issued in corresponding Chinese Appln No. 2019-0166176.7 (in Chinese), 10 pages.

* cited by examiner

GAMMA VOLTAGE GENERATING CIRCUIT AND DISPLAY DRIVING DEVICE INCLUDING THE SAME

CROSS-REFERENCE TO RELATED APPLICATIONS

This application is a divisional of U.S. patent application Ser. No. 17/391,433 filed on Aug. 2, 2021, which is a continuation application of U.S. patent application Ser. No. 16/199,416 filed Nov. 26, 2018, now U.S. Pat. No. 11,127,365 issued on Sep. 21, 2021, which claims priority 35 U.S.C. § 119 to Korean Patent Application No. 10-2018-0051238, filed on May 3, 2018 in the Korean Intellectual Property Office, the disclosures of which are incorporated by reference herein in their entirety.

TECHNICAL FIELD

Exemplary embodiments of the present inventive concept relate to a gamma voltage generating circuit and a display driving device including the same.

DISCUSSION OF RELATED ART

Liquid crystal devices (LCD), organic light emitting devices (OLED), or the like are used in the display devices of electronic devices such as TVs, laptop computers, monitors, mobile devices, or the like, for displaying images thereon. The display device may include a display panel having a plurality of pixels and a display driving device for applying an electrical signal to the plurality of pixels, and an image may be implemented through the electrical signal provided by the display driving device to the plurality of pixels.

SUMMARY

According to an exemplary embodiment of the present inventive concept, a gamma voltage generating circuit includes a gamma buffer configured to output a gamma voltage, a first gamma line and a second gamma line providing an output path of the gamma voltage, an output selecting unit configured to connect an output terminal of the gamma buffer to one of the first gamma line and the second gamma line, and an output resistor unit having a first resistor connected to the first gamma line and a second resistor connected to the second gamma line. The second resistor has a resistance value different from that of the first resistor.

According to an exemplary embodiment of the present inventive concept, a gamma voltage generating circuit includes a plurality of gamma buffers configured to output a plurality of gamma voltages, a plurality of gamma lines having a plurality of first gamma lines and a plurality of second gamma lines connected to output terminals of first gamma buffers among the plurality of gamma buffers and a plurality of common gamma lines connected to output terminals of second gamma buffers different from the first gamma buffers among the plurality of gamma buffers, a first resistor string including a plurality of first resistors connected to one another in series and connected to the plurality of first gamma lines and the plurality of common gamma lines, and a second resistor string including a plurality of second resistors connected to one another in series and connected to the plurality of second gamma lines.

According to an exemplary embodiment of the present inventive concept, a display driving device includes a source buffer unit having a plurality of source buffers corresponding to a plurality of source lines, a decoder unit configured to receive image data and a plurality of gamma voltages and supply at least one of the plurality of gamma voltages, based on the image data, to an input terminal of each of the plurality of source buffers, and a gamma voltage generating circuit configured to transmit the plurality of gamma voltages to the decoder unit through a plurality of gamma lines. The number of the plurality of gamma lines is greater than the number of the plurality of gamma voltages.

BRIEF DESCRIPTION OF THE DRAWINGS

The above and other aspects and features of the present inventive concept will be more clearly understood by describing in detail exemplary embodiments thereof with reference to the accompanying drawings.

DETAILED DESCRIPTION OF THE EMBODIMENTS

Figure 1:
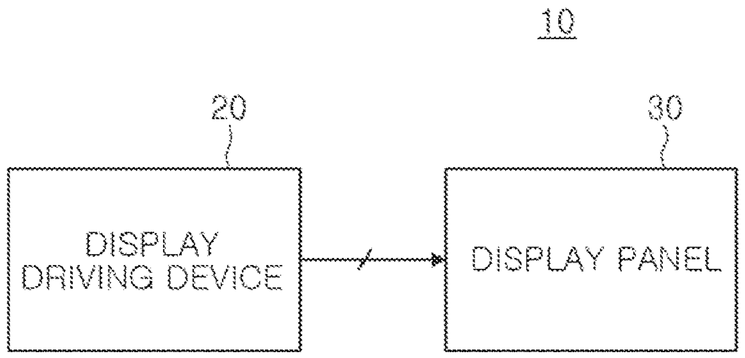
FIGS. 1 and 2 are simplified block diagrams illustrating a display device including a display driving device according to an exemplary embodiment of the present inventive concept.

Exemplary embodiments of the present inventive concept provide a gamma voltage generating circuit and a display driving device capable of effectively managing power consumption of a display device by controlling power consumption of the gamma voltage generating circuit based on an operating condition of the display device.

Hereinafter, exemplary embodiments of the present inventive concept will be described with reference to the accompanying drawings. Like reference numerals may refer to like elements throughout this application.

FIG. 1 is a simplified block diagram illustrating a display device including a display driving device according to an exemplary embodiment of the present inventive concept. Referring to FIG. 1, a display device 10 according to an exemplary embodiment of the present inventive concept may include a display driving device 20 and a display panel 30.

The display driving device 20 may include a gate driver and a source driver for inputting image data received from an external processor, or the like, to the display panel 30, and a timing controller for controlling the gate driver and the source driver. The timing controller may control the gate driver and the source driver according to a vertical synchronization signal and a horizontal synchronization signal.

A processor for transmitting image data to the display driving device 20 may be an application processor (AP) in the case of a mobile device, or may be a central processing unit (CPU) or a System-on-Chip (SoC) in the case of a desktop computer, a laptop computer, a television, or the like. In detail, the processor may be understood as a processing device having an arithmetic function. The processor may generate image data to be displayed through the display device 10, or receive the image data from a memory, a communication module, or the like and transmit the image data to the display driving device 20.

Figure 2:
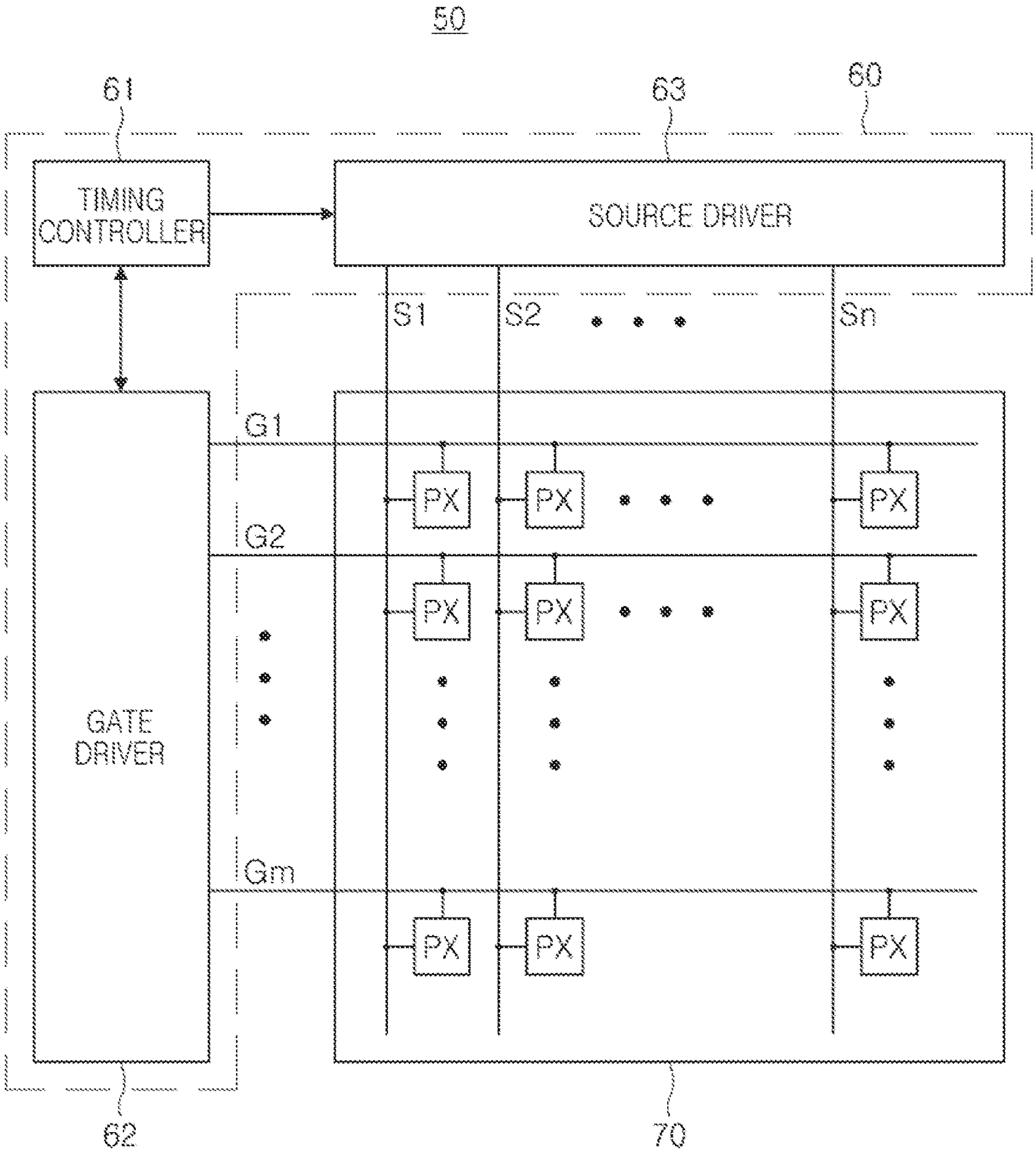

FIG. 2 is a simplified block diagram illustrating a display device including a display driver according to an exemplary embodiment of the present inventive concept.

Referring to FIG. 2, a display device 50 may include a display driver 60 and a display panel 70. The display driver 60 may include a timing controller 61, a gate driver 62, a source driver 63, and the like. The display panel 70 may include a plurality of gate lines G1 to Gm and a plurality of pixels PX disposed along a plurality of source lines S1 to Sn.

In an exemplary embodiment of the present inventive concept, the display device 50 may display an image in frame units. A time required to display one frame may be referred to as a vertical period, and the vertical period may be determined by a frame frequency of the display device 50. According to an exemplary embodiment of the present inventive concept, when the frame frequency of the display device 50 is 60 Hz, the vertical period may be 1/60 second (about 16.7 msec).

During one vertical period, the gate driver 62 may scan the plurality of gate lines G1 to Gm, sequentially. A time which the gate driver 62 scans each of the plurality of gate lines G1 to Gm may be referred to as a horizontal period. During one horizontal period, the source driver 63 may input a gradation voltage to the pixels PX. The gradation voltage may be a voltage output by the source driver 63 based on the image data, and brightness of each of the pixels PX may be determined by the gradation voltage.

Figure 3:
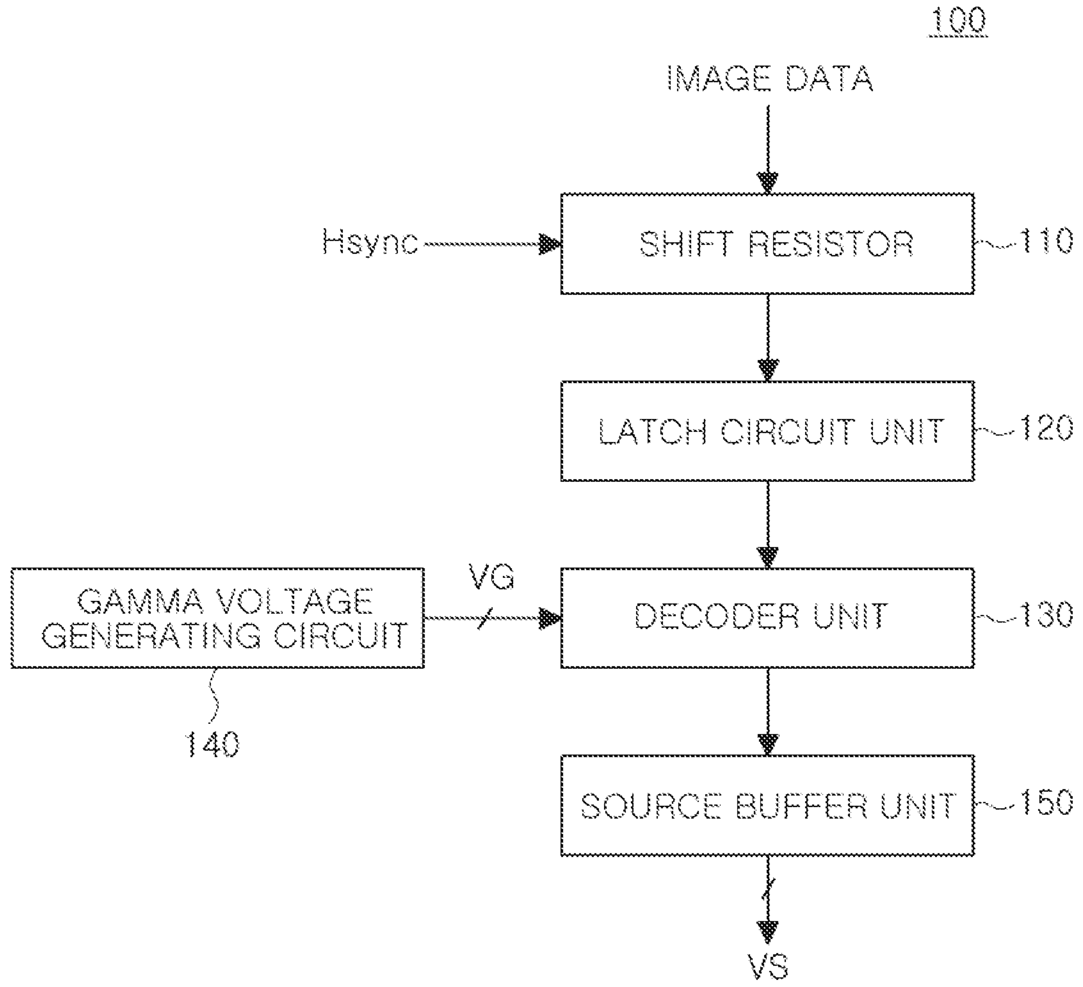
FIG. 3 is a simplified block diagram illustrating a source driver according to an exemplary embodiment of the present inventive concept.

FIG. 3 is a simplified block diagram illustrating a source driver according to an exemplary embodiment of the present inventive concept.

Referring to FIG. 3, a source driver 100 according to an exemplary embodiment of the present inventive concept may include a shift register 110, a latch circuit unit 120, a decoder unit 130, a gamma voltage generating circuit 140, a source buffer unit 150, and the like. In an exemplary embodiment of the present inventive concept, the latch circuit unit 120 may include sampling circuits sampling data and holding latches storing data sampled by the sampling circuits. Each of the elements 110 to 150 included in the source driver 100 is not limited to the exemplary embodiment illustrated in FIG. 3, and may be variously modified in other exemplary embodiments.

The shift register 110 may control an operation timing of each of the plurality of sampling circuits included in the latch circuit unit 120 in response to a horizontal synchronization signal Hysnc. The horizontal synchronization signal Hsync may be a signal having a predetermined period, and may be a signal determining a scan period of pixels connected to each of the gate lines of the display panel. The latch circuit unit 120 may sample and hold image data according to a shift order of the shift register 110. The latch circuit unit 120 may output the image data to the decoder unit 130. The decoder unit 130 may be a digital-analog converter DAC outputting an analog signal corresponding to the image data.

The decoder unit 130 may receive a plurality of gamma voltages VG together with the image data, and the plurality of gamma voltages VG may be supplied by the gamma voltage generating circuit 140. The gamma voltage generating circuit 140 may determine the number of the plurality of gamma voltages VG based on the number of bits of the image data, and may determine a magnitude of each of the plurality of gamma voltages VG based on an operating condition of the display device, a gamma register setting, or the like.

As described, in an exemplary embodiment of the present inventive concept, the number of the plurality of gamma voltages VG may be determined according to the number of bits of the image data. For example, when the image data is 8-bit data, the number of the plurality of gamma voltages VG may be 256 or less, and when the image data is 10-bit data, the number of the plurality of gamma voltages VG may be 1024 or less. In other words, when the image data is data having N bits, the plurality of gamma voltages VG may have $2^N$ different magnitudes.

A source buffer unit 150 may include a plurality of source buffers implemented by an operational amplifier, and the plurality of source buffers may be connected to the plurality of source lines provided in the display panel. Each of the plurality of source buffers may have a plurality of input terminals. The decoder unit 130 may select at least a portion of the plurality of gamma voltages VG based on the image data, and transmit the at least a portion of the plurality of gamma voltages VG as input voltages to the plurality of source buffers. Each of the plurality of source buffers may output a voltage corresponding to the input voltages received from the decoder unit 130, as a gradation voltage to each of the plurality of source lines. For example, when the image data is 8-bit data, the number of the plurality of gamma lines, provided by the gamma voltage generating circuit 140 to transmit the plurality of gamma voltages VG to the decoder unit 130, may be 256 or more.

The gamma voltage generating circuit 140 may select at least a portion of a plurality of reference voltages to determine a magnitude of each of the plurality of gamma voltages VG, and the plurality of gamma voltages VG may be input to gamma lines through a resistor string provided at an output terminal of the gamma voltage generating circuit 140. A current flowing in the resistor string may be determined by the magnitude of each of the plurality of gamma voltages VG determined by the gamma voltage generating circuit 140. As the current flowing in the resistor string increases, power consumption of the gamma voltage generating circuit 140 may be also increased. In an exemplary embodiment of the present inventive concept, a plurality of resistor strings may be formed of resistors having different resistance values, and one of the resistor strings may be selected according to an operating condition of the display device, thus efficiently controlling the power consumption of the display driving device.

Figure 4:
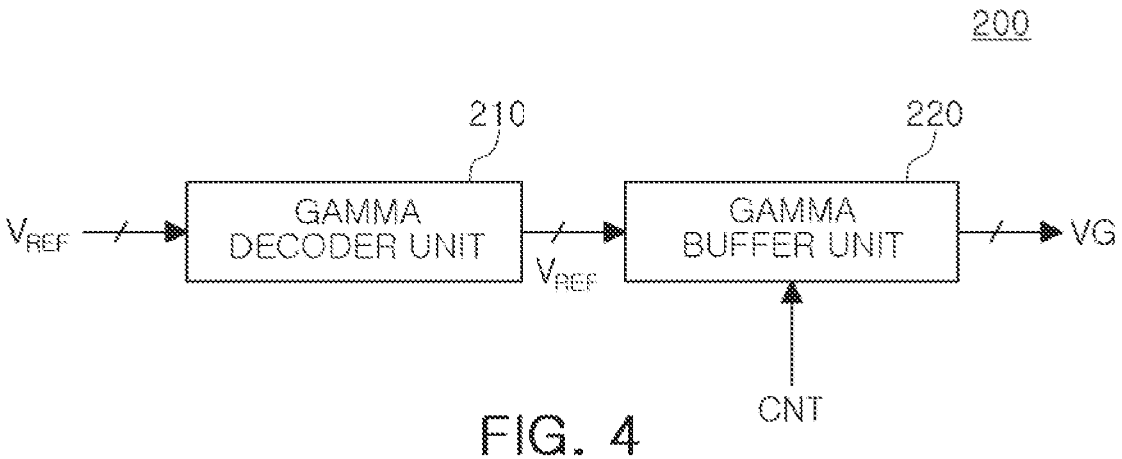
FIG. 4 is a simplified block diagram illustrating a gamma voltage generating circuit according to an exemplary embodiment of the present inventive concept.

FIG. 4 is a simplified block diagram illustrating a gamma voltage generating circuit according to an exemplary embodiment of the present inventive concept.

Referring to FIG. 4, a gamma voltage generating circuit 200 according to an exemplary embodiment of the present inventive concept may include a gamma decoder unit 210 and a gamma buffer unit 220. The gamma decoder unit 210 may include a plurality of multiplexers, and each of the plurality of multiplexers may receive a plurality of reference voltages $V_{REF}$. The plurality of reference voltages $V_{REF}$ may be input to each of the plurality of multiplexers. Each of the plurality of multiplexers may select one of the plurality of input reference voltages $V_{REF}$ to output, and an output of the plurality of multiplexers may be provided as the plurality of gamma voltages VG. Accordingly, the magnitude of each of the plurality of gamma voltages VG may be determined by the gamma decoder unit 210.

The gamma buffer unit 220 may include a plurality of gamma buffers, and each of the plurality of gamma buffers may receive at least one of the plurality of gamma voltages VG and output the received voltage. A resistor string may be connected to an output terminal of the plurality of gamma buffers, the resistor string may have a plurality of resistors connected to each other in series. For example, nodes between the plurality of resistors may be connected to the output terminal of the plurality of gamma buffers, and the plurality of gamma voltages VG may be output at the nodes between the plurality of resistors.

In an exemplary embodiment of the present inventive concept, at least a portion of the output terminal of the plurality of gamma buffers may be connected to the plurality of resistor strings disposed in parallel to one another. In an exemplary embodiment of the present inventive concept, a portion of gamma buffers having an output terminal connected to the plurality of resistor strings may output relatively large gamma voltages VG compared with other gamma buffers. Therefore, a relatively large amount of electric power may be consumed in the resistors connected to the output terminal of the portion of gamma buffers.

In an exemplary embodiment of the present inventive concept, one of a plurality of resistor strings may be selectively connected to the output terminal of the portion of gamma buffers according to an operating condition of the display device. For example, a first resistor string and a second resistor string may be selectively connected to the output terminal of the portion of gamma buffers and the first resistor string may have a lower resistance than that of the second resistor string.

When frame frequency and/or brightness of the display device is reduced or the display device operates in a low power mode, or the like, the second resistor string may be connected to the output terminal of the portion of the gamma buffers. Since magnitudes of the gamma voltages VG may be determined by the gamma decoder unit 210, the magnitudes of the gamma voltages may be maintained to be constant, regardless of whether the second resistor string is connected or not. Thus, when the second resistor string is connected to the output terminal of the portion of gamma buffers, a current flowing in the entire resistor string may be reduced, as compared to a case in which the first resistor string is connected to the output terminal of the portion of the gamma buffers. Therefore, power consumption of the gamma voltage generating circuit may be effectively managed according to the operating condition of the display device.

A control signal CNT may be input to the gamma buffer unit 220 such that one of the first resistor string and the second resistor string may be selected and connected to the output terminal of the portion of gamma buffers. For example, a de-multiplexer may be connected between the output terminal of the portion of gamma buffers and the first and second resistor strings, and the de-multiplexer may connect the output terminal of the portion of gamma buffers to the first resistor string or the second resistor string in response to the control signal CNT.

Figure 5:
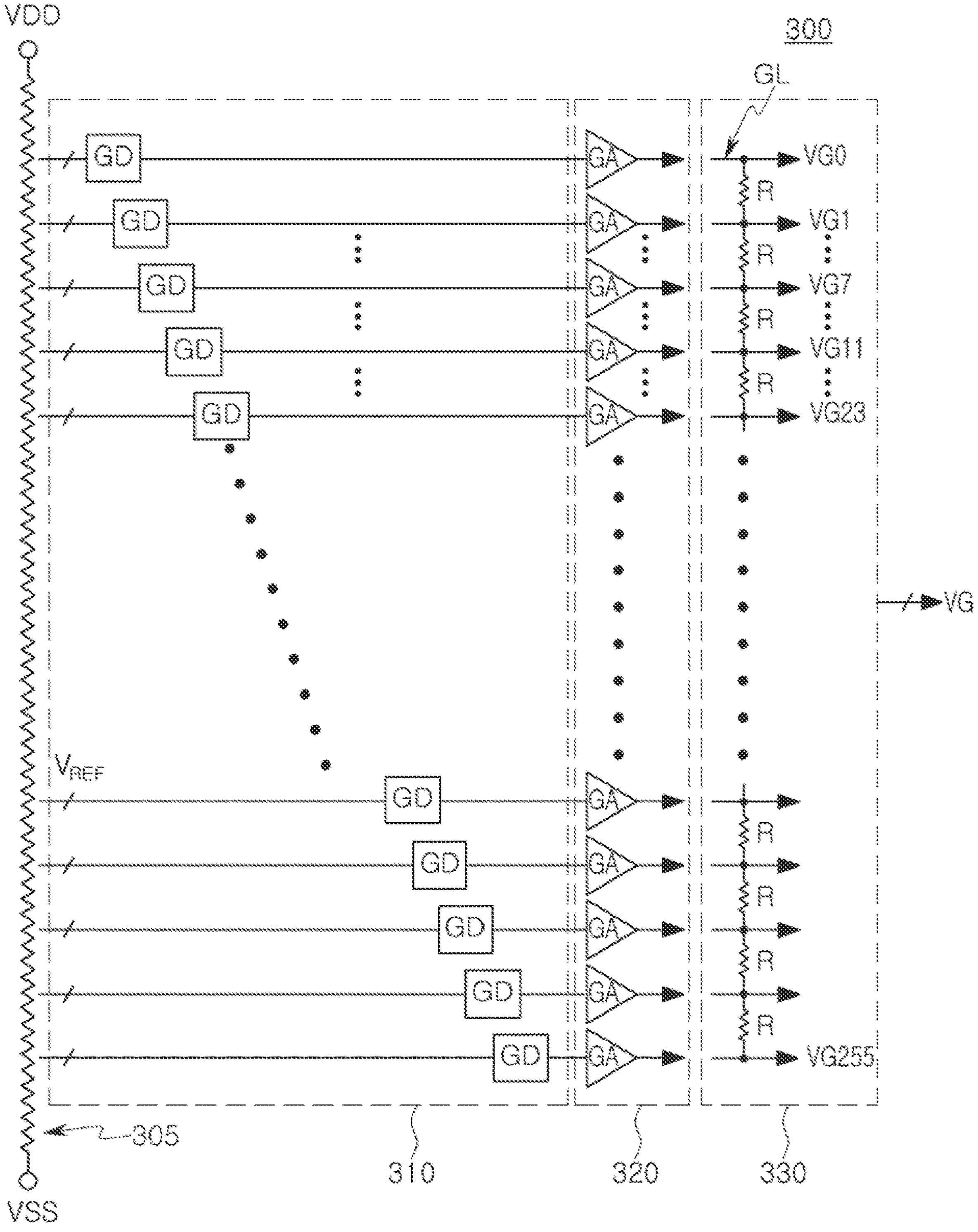
FIG. 5 is a simplified circuit diagram illustrating a gamma voltage generating circuit according to an exemplary embodiment of the present inventive concept.

FIG. 5 is a simplified circuit diagram illustrating a gamma voltage generating circuit according to an exemplary embodiment of the present inventive concept.

Referring to FIG. 5, a gamma voltage generating circuit 300 may include a reference voltage generating unit 305, a gamma decoder unit 310, a gamma buffer unit 320, an output resistor unit 330, and the like. In an exemplary embodiment of the present inventive concept, the display driving device may have the gamma voltage generating circuit 300 for each color to be implemented in a pixel. For example, when one pixel includes a plurality of sub pixels each outputting red/green/blue light, the gamma voltage generating circuit 300 outputting gamma voltages for each of red/green/blue may be separately provided in the display driving device. According to exemplary embodiments of the present inventive concept, the gamma voltages for each of red/green/blue may have different magnitudes.

The reference voltage generating unit 305 may generate a plurality of reference voltages by using a first power voltage VDD and a second power voltage VSS. The plurality of reference voltages may be transmitted to the gamma decoder unit 310. For example, the plurality of reference voltages may be input to each of a plurality of gamma decoders GD included in the gamma decoder unit 310. In detail, each of the plurality of gamma decoders GD may receive the plurality of reference voltages, and may select one of the plurality of reference voltages to transmit to a corresponding one of a plurality of gamma buffers GA. In an exemplary embodiment of the present inventive concept, each of the plurality of the gamma decoders GD may be implemented as a multiplexer capable of selecting one of the plurality of reference voltages.

The gamma buffer unit 320 may include the plurality of gamma buffers GA. Each of the plurality of gamma buffers GA may receive a reference voltage output by one of the plurality of gamma decoders GD. For example, the plurality of gamma buffers GA may output the input reference voltages as a plurality of gamma voltages VG0 to VG255. VG. As described above, the number of the plurality of gamma voltages VG output by the gamma voltage generating circuit 300 may be determined according to the number of bits of the image data input to the source driver. For example, when the image data is N-bit data, the number of the plurality of gamma voltages VG may be $2^N$. In the exemplary embodiment illustrated in FIG. 5, when the source driver receives 8-bit image data, the number of the plurality of gamma voltages VG and a plurality of gamma lines GL for outputting the plurality of gamma voltages VG may be 256.

The output resistor unit 330 includes a plurality of resistors R, and each of the plurality of resistors R may be connected between the plurality of gamma lines GL. The plurality of gamma voltages VG may be output through the plurality of gamma lines GL. A current flowing in each of the plurality of resistors R may be determined according to the magnitude of each of the plurality of gamma voltages VG output by the plurality of gamma buffers GA. Therefore, power consumption of the output resistor unit 330 may be determined by the plurality of gamma voltages VG output through the plurality of gamma lines GL, an output current flowing in the plurality of resistors R, the size of each of the plurality of resistors R, and the like.

Since the magnitude of each of the plurality of gamma voltages VG to be output by the gamma voltage generating circuit 300 is determined by the plurality of gamma decoders GD, the plurality of resistors R together with the output current flowing in the plurality of resistors R may be adjusted to reduce the power consumption of the output resistor unit 330. When only one of the output current and the plurality of resistors R is adjusted, the magnitudes of the plurality of gamma voltages VG may be changed, causing an unintended brightness change and/or screen distortion in the display device.

In an exemplary embodiment of the present inventive concept, to prevent the unintended distortion of the screen, or the like, from being displayed by the display device and to simultaneously reduce the power consumption, the output resistor unit 330 may include a first resistor string and a second resistor string having different resistors. In addition, a circuit may be provided for selecting one of the first resistor string and the second resistor string to connect to at least a portion of the output terminal of the plurality of gamma buffers GA. If the resistance of the first resistor string is smaller than the resistance of the second resistor string, by connecting the second resistor string instead of the first resistor string to the output terminal of at least a portion of the plurality of gamma buffers GA, the power consumption of the output resistor unit 330 may be reduced.

Figure 6:
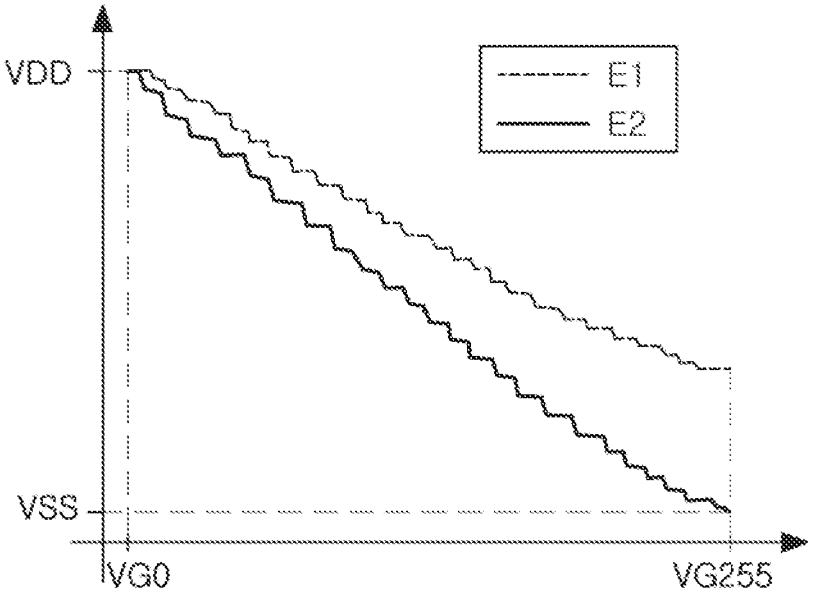
FIG. 6 is a graph illustrating an operation of a gamma voltage generating circuit according to an exemplary embodiment of the present inventive concept.

FIG. 6 is a graph illustrating an operation of a gamma voltage generating circuit according to an exemplary embodiment of the present inventive concept.

As described above, the gamma voltage generating circuit may include the plurality of gamma decoders selecting one of a plurality of reference voltages, and the magnitudes of the plurality of gamma voltages VG0 to VG255 may be determined by the reference voltages selected by the gamma decoders. The reference voltage may be determined as a voltage between the first power voltage VDD and the second power voltage VSS.

Depending on an operating condition of the display device, an operation of each of the gamma decoders may be changed. For example, referring to a graph illustrated in FIG. 6, the magnitudes of the plurality of gamma voltages VG0 to VG255 determined by the gamma decoders in a first example embodiment E1 and a second example embodiment E2 may be changed. First, referring to the first example embodiment E1, the gamma decoders may determine a maximum gamma voltage VG0 as the first power voltage VDD, and a minimum gamma voltage VG255 as the second power voltage VSS. On the other hand, in the second example embodiment E2, the minimum gamma voltage VG255 may be determined to be higher than the second power voltage VSS. Each of the gamma decoders may select one of the plurality of reference voltages according to an operating condition of the display device, a resistor setting value of the display device, or the like. Accordingly, the magnitude of each of the plurality of gamma voltages VG0 to VG255 may also vary, according to the operating condition of the display device, the resistor setting value of the display device, or the like.

FIGS. 7 to 10 are simplified circuit diagrams illustrating a gamma voltage generating circuit according to exemplary embodiments of the present inventive concept.

Figure 7:
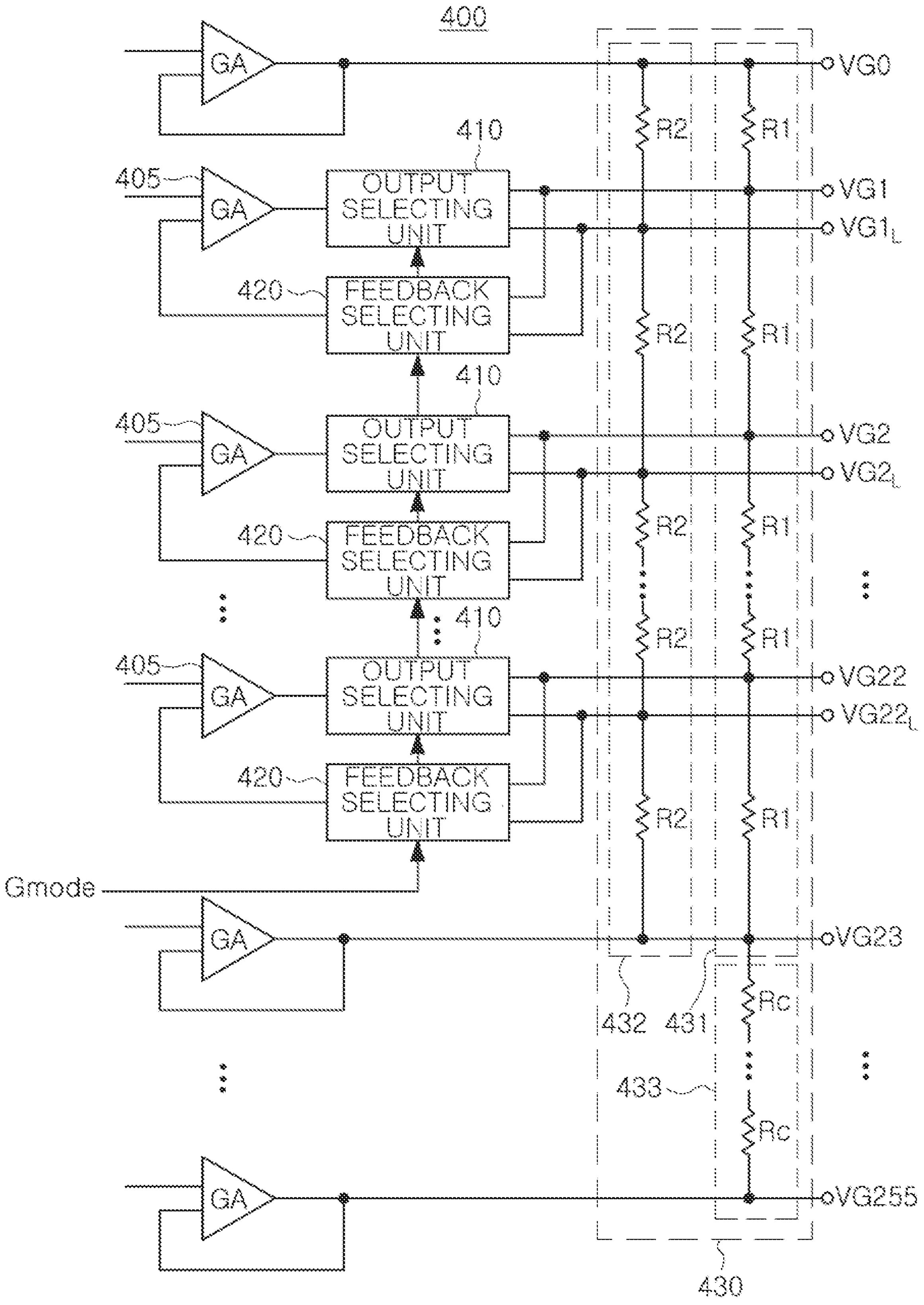
FIGS. 7 to 10 are simplified circuit diagrams illustrating a gamma voltage generating circuit according to exemplary embodiments of the present inventive concept.

First, referring to FIG. 7, a gamma voltage generating circuit 400 according to an exemplary embodiment of the present inventive concept may include the plurality of gamma buffers GA, an output selecting unit 410 and a feedback selecting unit 420 connected to each of first gamma buffers 405 of the plurality of gamma buffers GA, an output resistor unit 430, and the like. The output selecting unit 410 and the feedback selecting unit 420 may determine a transmission path of an electrical signal, and may be operated by a control signal Gmode transmitted from a timing controller of the display device, or the like.

First gamma lines or second gamma lines may be connected to an output terminal of the first gamma buffers 405 which are at least a portion of the plurality of gamma buffers GA. The first gamma lines may be conductive lines connected to a first resistor string 431, and the second gamma lines may be conductive lines connected to a second resistor string 432. In an exemplary embodiment of the present inventive concept, the first gamma lines or the second gamma lines are selected by the output selecting unit 410 to connect the output terminal of the first gamma buffers 405. On the other hand, the feedback selecting unit 420 may be connected to feedback paths of the first gamma buffers 405. The feedback selecting unit 420 may connect the first gamma lines or the second gamma lines to the input terminal of the first gamma buffers 405.

The output resistor unit 430 may include the first resistor string 431, the second resistor string 432, and a common resistor string 433. The first resistor string 431 may be connected to the first gamma lines, and may include first resistors R1 connected to one another in series. On the other hand, the second resistor string 432 may be connected to the plurality of the second gamma lines and may include second resistors R2 connected to one another in series. Since the first gamma lines or the second gamma lines are selected by the output selecting unit 410 and the feedback selecting unit 420, only one of the first resistor string 431 and the second resistor string 432 may be connected to the output terminal and the feedback paths of the first gamma buffers 405. The first resistors R1 may have different values as compared to the second resistors R2, and for example, each of the first resistors R1 may have a lower resistance than each of the second resistors R2.

The output selecting unit 410 and the feedback selecting unit 420 may be controlled by a single control signal Gmode, and accordingly may simultaneously select one of the first gamma lines and the second gamma lines. For example, when the output selecting unit 410 connects the output terminal of the first gamma buffers 405 to the first gamma lines GL1, the feedback selecting unit 420 may select the feedback paths for connecting the input terminal of the first gamma buffers 405 to the first gamma lines. Similarly, when the output selecting unit 410 connects the output terminal of the first gamma buffers 405 to the second gamma lines, the feedback selecting unit 420 may connect the input terminal of the first gamma buffers 405 to the second gamma lines.

The magnitude of each of first gamma voltages VG1 to VG22 output from the first gamma lines may be substantially equal to the magnitude of each of second gamma voltages $VG1_L$ to $VG22_L$ output from the second gamma lines. For example, the magnitude of the first gamma voltages VG1 to VG22 in which the output terminal of the first gamma buffers 405 is connected to the first gamma lines and output from the first gamma lines may be substantially equal to the magnitude of each of the second gamma voltages $VG1_L$ to $VG22_L$ in which the output terminal of the first gamma buffers 405 is connected to the second gamma lines and output from the second gamma lines.

Figure 8:
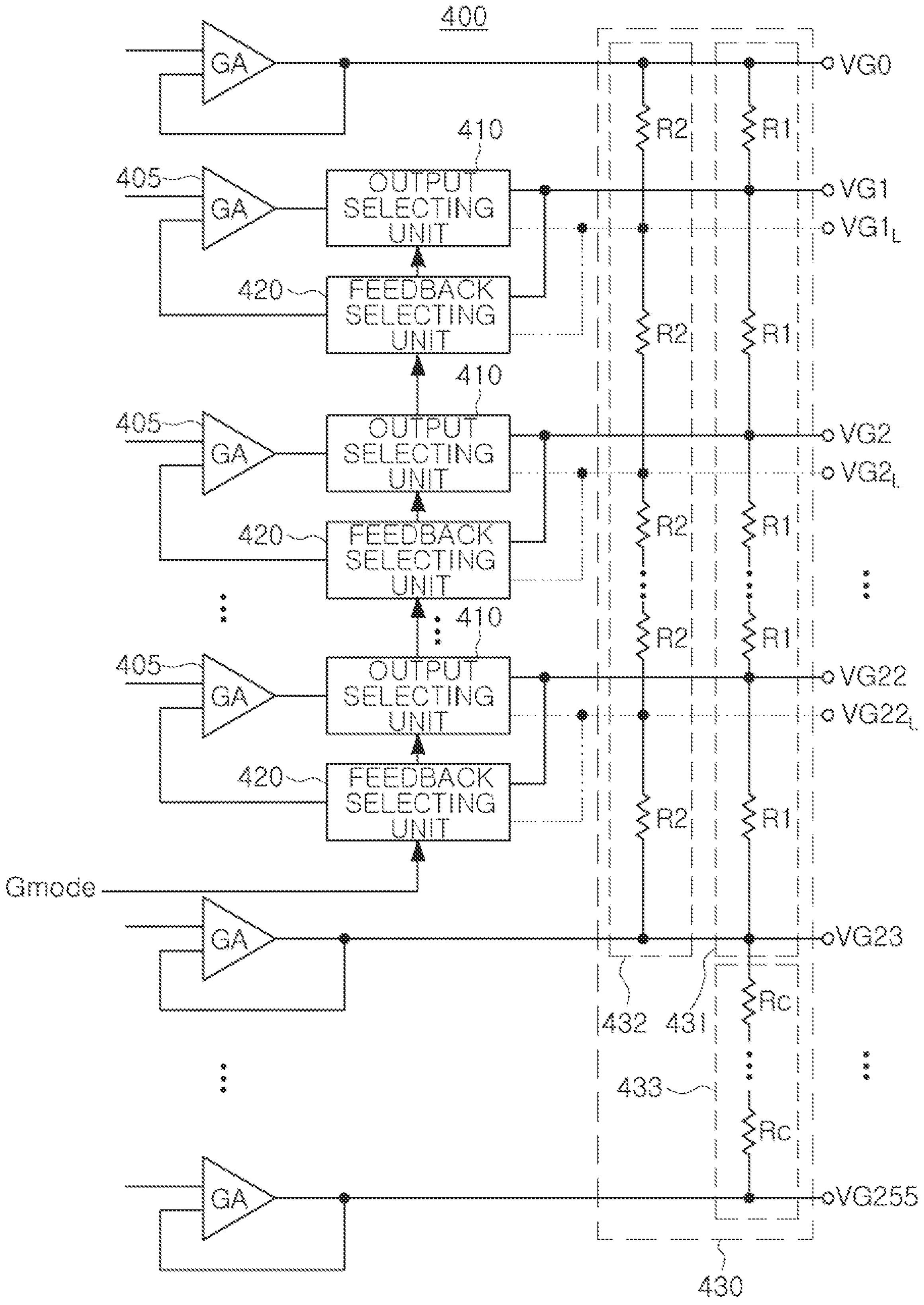

In an exemplary embodiment illustrated in FIG. 8, when the output selecting unit 410 and the feedback selecting unit 420 select the first gamma lines, the total resistance of the output resistor unit 430 may be determined by the first resistor string 431 and the common resistor string 433. In the exemplary embodiment of FIG. 8, a current flowing through the first resistor string 431 and the common resistor string 433 may be referred to as a first current.

Figure 9:
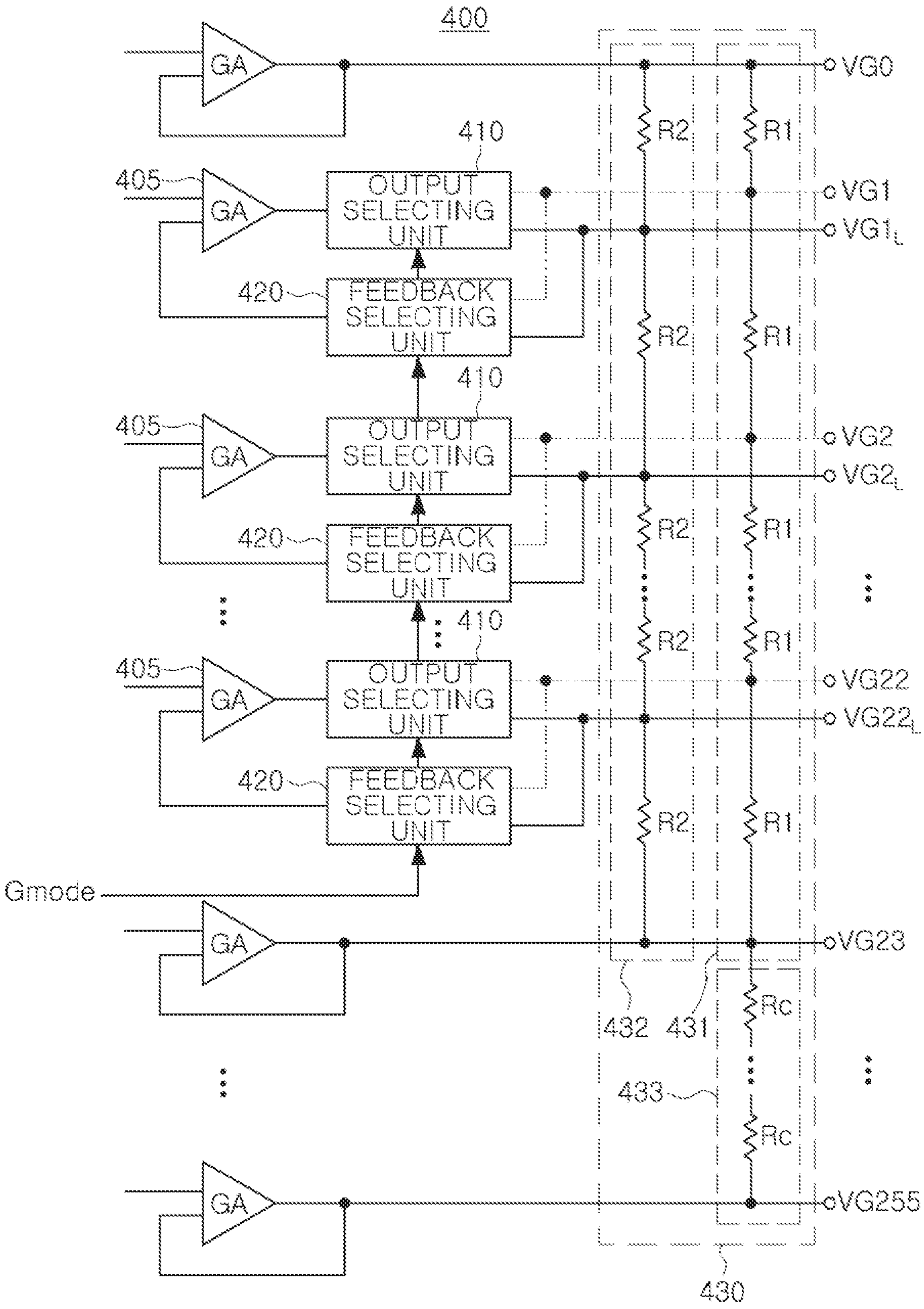

On the other hand, in an exemplary embodiment illustrated in FIG. 9, when the output selecting unit 410 and the feedback selecting unit 420 select the second gamma lines, the total resistance of the output resistor unit 430 may be determined by the second resistor string 432 and the common resistor string 433. In the exemplary embodiment of FIG. 9, a current flowing through the second resistor string 432 and the common resistor string 433 may be referred to as a second current.

As described above, the resistance of the first resistor string 431 is smaller than the resistance of the second resistor string 432. Therefore, when the output selecting unit 410 and the feedback selecting unit 420 select the second gamma lines, the current flowing in the output resistor unit 430 may be reduced as compared to when the first gamma lines are selected. In other words, the second current may be smaller than the first current. Accordingly, in operating conditions in which the display device operates in a low power mode or the frame frequency and/or brightness of the display device is reduced, or the like, the power consumption of the output resistor unit 430 may be reduced by controlling the output selecting unit 410 and the feedback selecting unit 420 to select the second gamma lines.

In addition, in the exemplary embodiment illustrated in FIG. 7, a portion of the plurality of gamma buffers GA may be selected as the first gamma buffers 405 based on the magnitude of the plurality of gamma voltages VG. For example, the first gamma buffers 405 may be buffers outputting a relatively large voltage among the plurality gamma voltages VG. The current flowing through the resistor connected to the output terminal of the plurality of gamma buffers GA may have a tendency to increase as the voltage output by each of the plurality of gamma buffers GA increases. Therefore, in an exemplary embodiment of the present inventive concept, buffers outputting a relatively large voltage among the plurality of gamma voltages VG are selected as the first gamma buffers 405, and the circuit may be configured such that one of the first resistor string 431 and the second resistor string 432 may be selectively connected to the output terminal of the first gamma buffers 405. The first resistor string 431 and the second resistor string 432 may have different resistance values, one of the first resistor string 431 and the second resistor string 432 is connected to the output terminal of the first gamma buffers 405 based on the operating condition of the display device, and the power consumed in the output resistor unit 430 is efficiently managed.

In the exemplary embodiment illustrated in FIG. 7, one of the first resistor string 431 and the second resistor string 432 may be connected to the output terminal of the first gamma buffers 405 by the control signal Gmode input to the output selecting unit 410 and the feedback selecting unit 420. The control signal Gmode may have a value determined by the operating conditions of the display device, or the like. For example, when the frame frequency of the display device is high or the brightness of the display device is bright, the control signal Gmode may control the output selecting unit 410 and the feedback selecting unit 420 to select the first gamma lines. When the output selecting unit 410 and the feedback selecting unit 420 select the first gamma lines, the first gamma voltages VG1 to VG22 may be output by the first resistor string 431. Accordingly, the power consumption of the output resistor unit 430 may be increased, and an operating speed of the display driving device may be increased.

On the contrary, when the frame frequency and/or the brightness of the display device is reduced, or the display device enters the low power mode, the control signal Gmode may control the output selecting unit 410 and the feedback selecting unit 420 to select the second gamma lines. As described above, the second gamma voltages $VG1_L$ to $VG22_L$ output through the second gamma lines may have substantially the same magnitude as the first gamma voltages VG1 to VG22 output through the first gamma lines. However, since the second gamma voltages $VG1_L$ to $VG22_L$ are output by the second resistor string 432 having a higher level of resistance than the first resistor string 431, the current flowing through the output resistor unit 430 is reduced and power consumption may be lowered.

Figure 10:
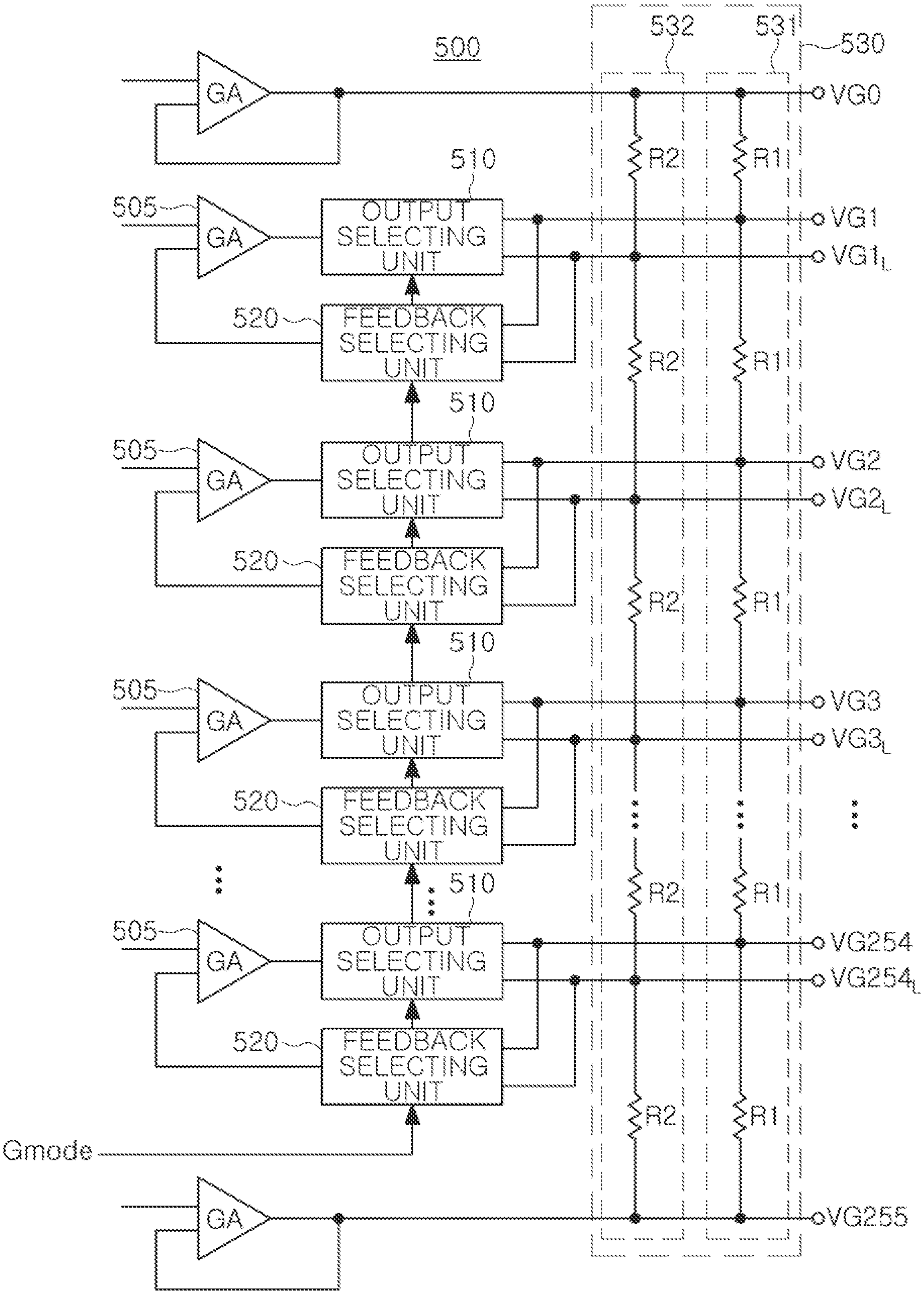

Referring to FIG. 10, all of the gamma buffers GA, except for the gamma buffers GA outputting the maximum gamma voltage VG0 and the minimum gamma voltage VG255, may be selected as first gamma buffers 505. An output selecting unit 510 and a feedback selecting unit 520 may be respectively connected to an output terminal and feedback paths of each of the first gamma buffers 505, and the output selecting unit 510 and the feedback selecting unit 520 may select the first gamma lines or the second gamma lines.

When the output selecting unit 510 and the feedback selecting unit 520 select the first gamma lines, a current may flow in a first resistor string 531 by the plurality of gamma voltages VG. On the other hand, when the output selecting unit 510 and the feedback selecting unit 520 select the second gamma lines, a current may flow through a second resistor string 532 by the plurality of gamma voltages VG. The resistance of the first resistor string 531 may be smaller than the resistance of the second resistor string 532. Accordingly, when the frame frequency and/or the brightness of the display device is reduced, the display device enters the low power mode, or the like, the power consumption of the output resistor unit 530 may be lowered by controlling the output selecting unit 510 and the feedback selecting unit to select the second gamma lines. The operations of the output selecting unit 510 and the feedback selecting unit 520 may be controlled by the control signal Gmode.

In the exemplary embodiments illustrated in FIGS. 7 to 10, the output selecting units 410 and 510 and the feedback selecting units 420 and 520 may be controlled by the control signal Gmode. The control signal Gmode may control the output selecting units 410 and 510 and the feedback selecting units 420 and 520 to select the first gamma lines or the second gamma lines based on the frame frequency and brightness of the display device, whether the display device enters the low power mode or not, or the like.

In addition, the control signal Gmode may control the output selecting units 410 and 510 and the feedback selecting units 420 and 520 based on a gamma register value. The gamma register value may be a value for controlling the gamma decoders included in the gamma voltage generating circuit. Each of the gamma decoders receives a plurality of reference voltages, and may select one of the plurality of reference voltages based on the gamma register setting value to determine the magnitude of the gamma voltage.

In other words, the magnitudes of the plurality of gamma voltages may vary according to the gamma register value, and the difference between the maximum gamma voltage and the minimum gamma voltage may be different. The control signal Gmode may control the output selecting units 410 and 510 and the feedback selecting units 420 and 520 to select the first gamma lines or the second gamma lines by referring to the gamma register setting value.

Figure 11:
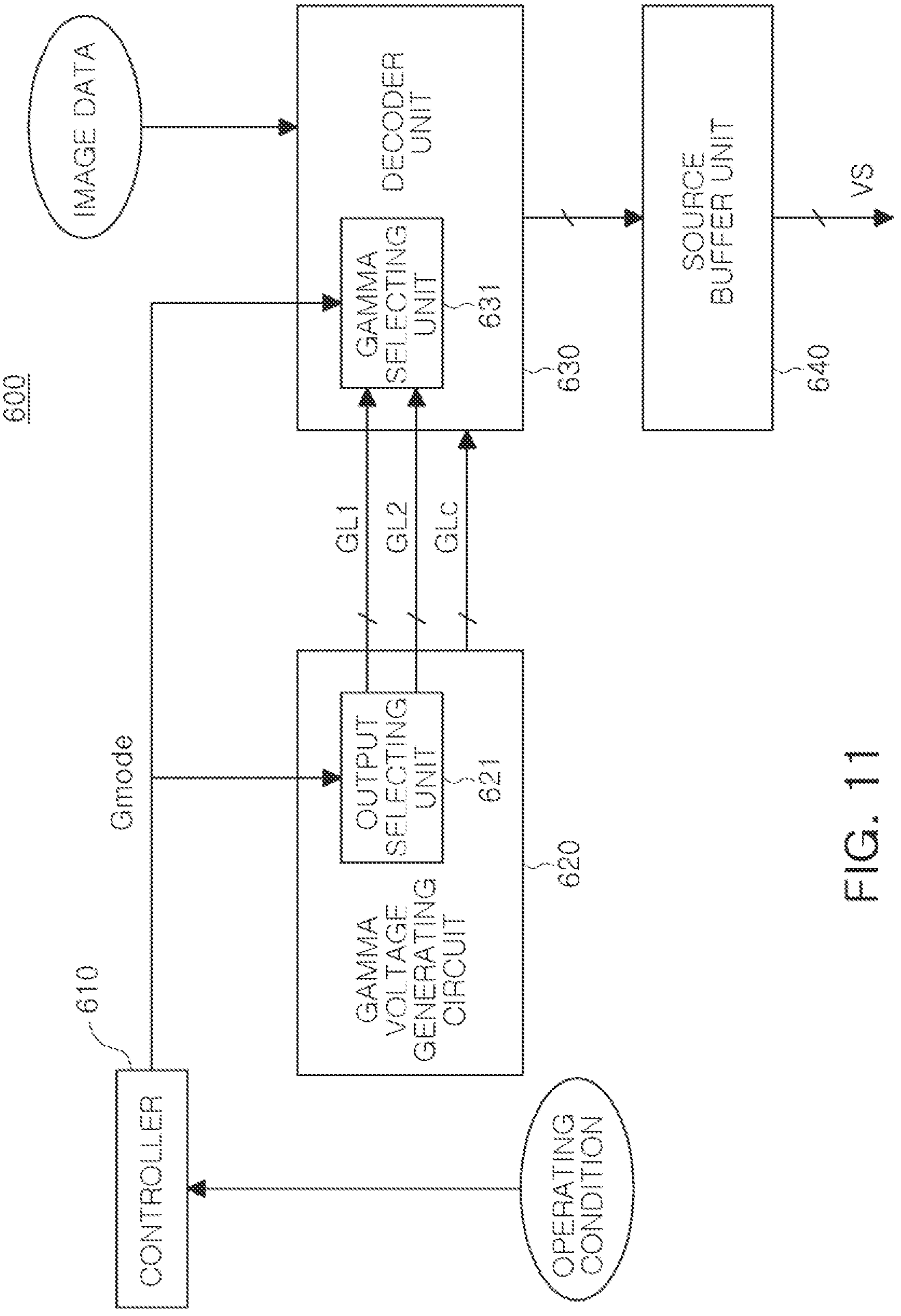
FIGS. 11 and 12 are diagrams illustrating an operation of a display driving device according to exemplary embodiments of the present inventive concept.
Figure 12:
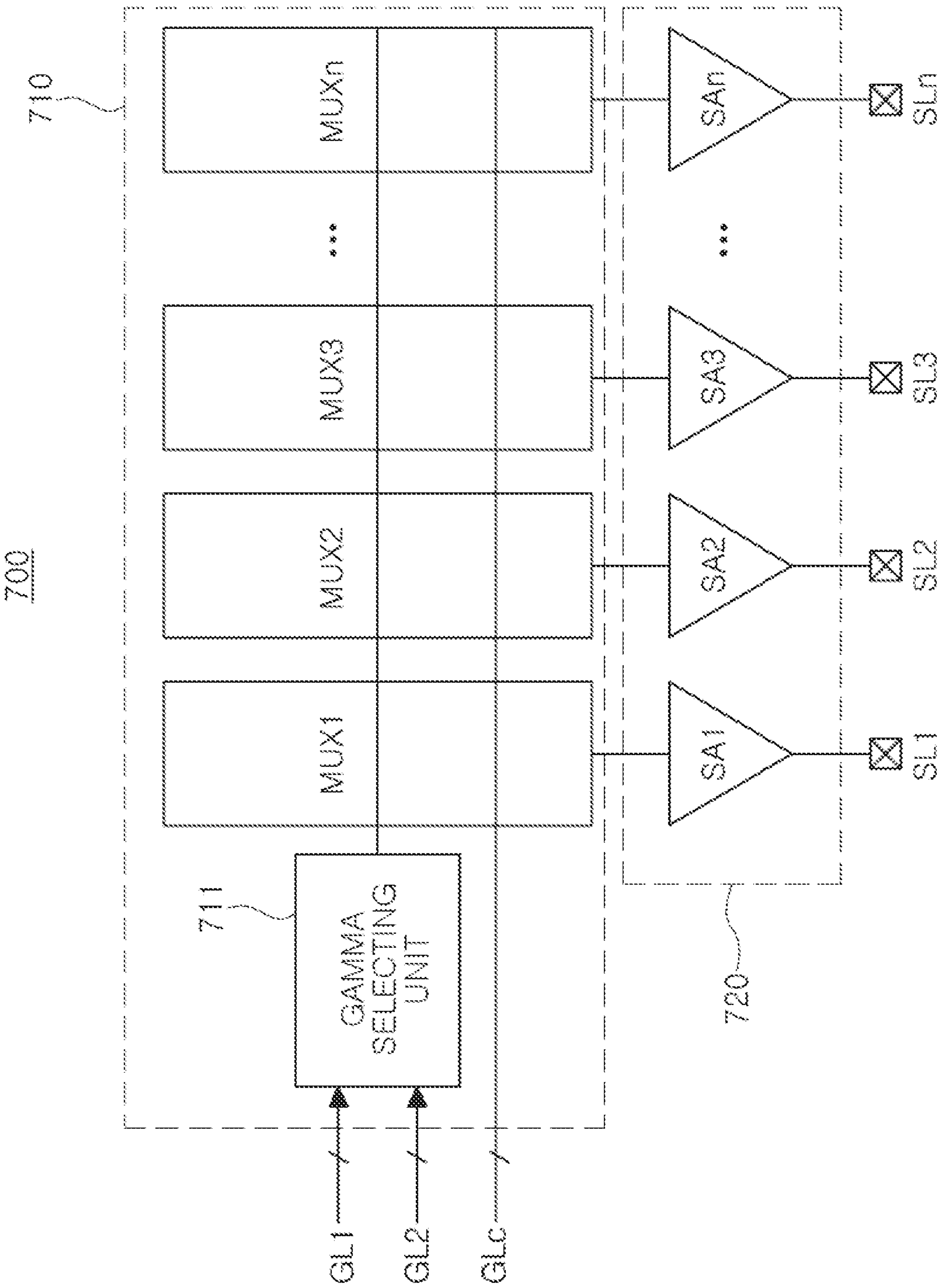

FIGS. 11 and 12 are diagrams illustrating an operation of a display driving device according to exemplary embodiments of the present inventive concept.

First, referring to FIG. 11, a display driving device 600 according to an exemplary embodiment of the present inventive concept may include a controller 610, a gamma voltage generating circuit 620, a decoder unit 630, a source buffer unit 640, and the like. The gamma voltage generating circuit 620 and the decoder unit 630 may be controlled by the controller 610. For example, an output selecting unit 621 of the gamma voltage generating circuit 620 and a gamma selecting unit 631 of the decoder unit 630 may be controlled by the control signal Gmode transmitted from the controller 610.

The gamma voltage generating circuit 620 may select at least a portion of the plurality of reference voltages to determine the magnitudes of the plurality of gamma voltages, and output the plurality of gamma voltages to the decoder unit 630. The plurality of gamma voltages may be output to a plurality of gamma lines GL between the gamma voltage generating circuit 620 and the decoder unit 630. The plurality of gamma lines GL may include first gamma lines GL1, second gamma lines GL2, and common gamma lines GLc. The number of the first gamma lines GL1 and the second gamma lines GL2 may be the same, and the number of the first gamma lines GL1 and the second gamma lines GL2 may be variously selected.

First gamma voltages output through the first gamma lines GL1 and second gamma voltages output through the second gamma lines GL2 may have substantially the same value. The first gamma lines GL1 and the second gamma lines GL2 may be connected to different resistor strings at the output terminal of the gamma voltage generating circuit 620, and the resistor strings may have different resistance values. Therefore, power consumed by the gamma voltage generating circuit 620 when the first gamma lines GL1 are activated and power consumed by the gamma voltage generating circuit 620 when the second gamma lines GL2 are activated may be different from each other. The output selecting unit 621 may activate the first gamma lines GL1 or the second gamma lines GL2 in response to the control signal mode Gmode. The common gamma lines GLc may be always activated while outputting the plurality of gamma voltages irrespective of the selection of the output selecting unit 621.

The gamma selecting unit 631 may receive the first gamma voltages or the second gamma voltage by selecting the first gamma lines GL1 or the second gamma lines GL2, respectively. The gamma selecting unit 631 is controlled by the control signal Gmode received by the output selecting unit 621, and accordingly, the gamma selecting unit 631 may select the first gamma lines GL1 or the second gamma lines GL2 activated by the output selecting unit 621.

The decoder unit 630 receives image data together with the gamma voltages, and may select at least a portion of the gamma voltages based on the image data to transmit the selected gamma voltages to the source buffer unit 640. The source buffer unit 640 may include a plurality of source buffers corresponding to a plurality of source lines provided in the display panel. An input terminal of each of the plurality of source buffers is connected to an output terminal of the decoder unit 630, and the decoder unit 630 may input one of the gamma voltages to each of the plurality of source buffers. Each of the plurality of source buffers may output a source voltage VS corresponding to the gamma voltage inputted from the decoder unit 630.

The controller 610 may output the control signal Gmode, based on the operating condition of the display device. In an exemplary embodiment of the present inventive concept, the operating condition of the display device may include the brightness of the display device, the frame frequency, whether to enter the low power mode, the gamma resistor value, or the like.

Next, referring to FIG. 12, a display driving device 700 according to an exemplary embodiment of the present inventive concept may include a decoder unit 710 and a source buffer unit 720. The decoder unit 710 may include a plurality of multiplexers MUX to MUXn, and the source buffer unit 720 may include a plurality of source buffers SA1 to SAn. Output terminals of the plurality of source buffers SA1 to SAn may be connected to a plurality of source lines SL1 to SLn provided in the display panel. Input terminals of the plurality of source buffers SA1 to SAn may be connected to the plurality of multiplexers MUX to MUXn.

Each of the plurality of multiplexers MUX to MUXn receives the plurality of gamma voltages through the plurality of gamma lines, and may select one of the plurality of gamma voltages to output. For example, each of the plurality of multiplexers MUX to MUXn may select one of the plurality of gamma voltages based on the image data.

In an exemplary embodiment of the present inventive concept, the plurality of gamma lines supplying the plurality of gamma voltages to the decoder unit 710 may include first gamma lines GL1, second gamma lines GL2, and common gamma lines GLc. For example, the first gamma lines GL1 and the second gamma lines GL2 may be selectively activated in an actual operation. In detail, when the first gamma lines GL1 are activated, the second gamma lines GL2 are not activated, and when the second gamma lines GL2 are activated, the first gamma lines GL1 are not activated. A gamma selecting unit 711 may be implemented as a multiplexer, and may connect the first gamma lines GL1 or the second gamma lines GL2 to the input terminal of the plurality of multiplexers MUX1 to MUXn.

The gamma voltages supplied through the first gamma lines GL1 and the gamma voltages through the second gamma lines GL2 may be substantially equal to each other. However, at the output terminal of the gamma voltage generating circuit for generating gamma voltages, the first resistor string connected to the first gamma lines GL1 and the second resistor string connected to the second gamma lines GL2 may have different resistance values. Therefore, according to a selection of the first gamma lines GL1 or the second gamma lines GL2, a current flowing through the output terminal of the gamma voltage generating circuit may vary, and accordingly, the power consumption of the display driving device 700 may be changed. In an exemplary embodiment of the present inventive concept, by selecting the first gamma lines GL1 or the second gamma lines GL2 according to various conditions, an operation performance and the power consumption of the display driving device 700 may be efficiently managed.

Figure 13:
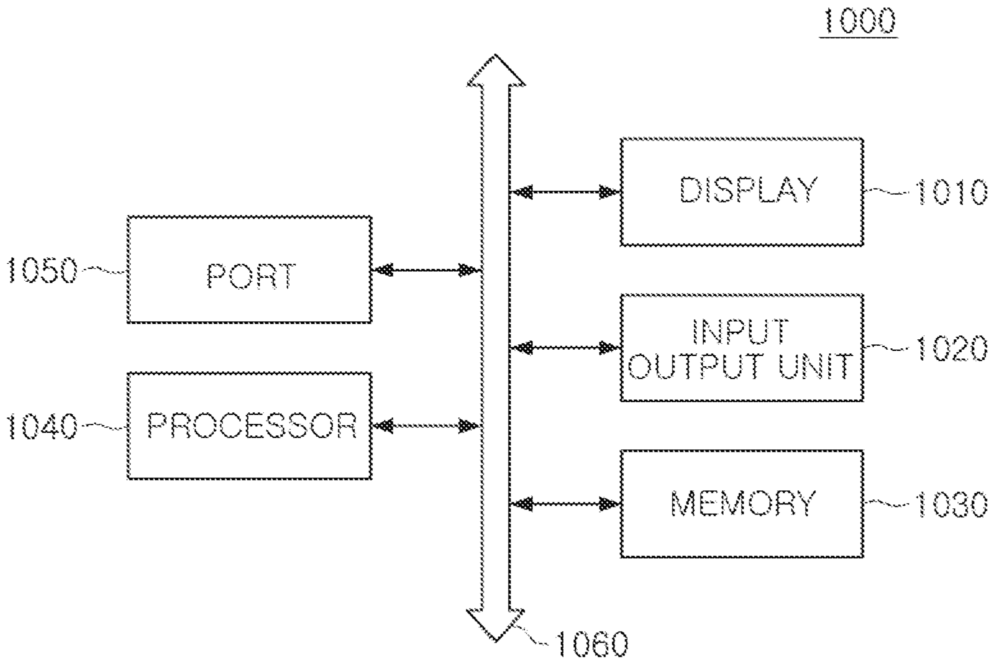
FIG. 13 is a block diagram illustrating an electronic device including a display device according to an exemplary embodiment of the present inventive concept.

FIG. 13 is a block diagram illustrating an electronic device including a display device according to an exemplary embodiment of the present inventive concept.

Referring to FIG. 13, an electronic device 1000 according to an exemplary embodiment of the present inventive concept may include a display 1010, an input/output unit 1020, a memory 1030, a processor 1040, a port 1050, and the like. The electronic device 1000 may include a television, a desktop computer, or the like, in addition to mobile devices such as a smartphone, a tablet PC, a laptop computer, or the like. Components such as the display 1010, the input/output unit 1020, the memory 1030, the processor 1040, the port 1050, and the like may communicate with one another via a bus 1060.

The display 1010 may include a display driver and a display panel. In an exemplary embodiment of the present inventive concept, the display driver may display image data transmitted by the processor 1040 via the bus 1060 on the display panel according to an operation mode. The display driver may generate gamma voltages corresponding to the number of bits of the image data transmitted by the processor 1040, and may select at least a portion of the gamma voltages according to the image data and input the selected gamma voltages to unit buffers. The display 1010 may be implemented based on various exemplary embodiments described above with reference to FIGS. 1 to 12.

As set forth above, according to exemplary embodiments of the present inventive concept, a gamma voltage generating circuit may connect a first resistor string or a second resistor string to an output terminal of at least a portion of a gamma buffer according to an operating condition of a display device.

While the present inventive concept has been shown and described above with reference to exemplary embodiments thereof, it will be apparent to those of ordinary skill in the art that modifications and variations in form and details could be made thereto without departing from the spirit and scope of the present inventive concept as set forth by the following claims.

What is claimed is:

1. A display driving device comprising:

a source buffer unit having a plurality of source buffers corresponding to a plurality of source lines;

a decoder unit configured to receive image data and a plurality of gamma voltages, and supply at least one of the plurality of gamma voltages, based on the image data, to an input terminal of each of the plurality of source buffers; and a gamma voltage generating circuit configured to transmit the plurality of gamma voltages to the decoder unit through a plurality of gamma lines, wherein the plurality of gamma lines include a plurality of first gamma lines, a plurality of second gamma lines, and a plurality of common gamma lines, and wherein the number of the plurality of gamma lines is greater than the number of the plurality of gamma voltages, and wherein the plurality of second gamma lines transmit gamma voltages of substantially the same magnitude as those transmitted by the plurality of first gamma lines to the decoder unit.

2. The display driving device of claim 1, wherein the image data has N bits, the plurality of gamma voltages have $2^N$ different magnitudes, and the number of the plurality of gamma lines is greater than $2^N$.

3. The display driving device of claim 1, wherein the number of the plurality of first gamma lines and the number of the plurality of second gamma lines are smaller than the number of the plurality of common gamma lines.

4. The display driving device of claim 1, wherein the decoder unit comprises a plurality of source decoders configured to input the at least one of the plurality of gamma voltages to the input terminal of each of the plurality of source buffers, and a gamma selecting unit configured to connect the plurality of first gamma lines or the plurality of second gamma lines to the plurality of source decoders.

5. The display driving device of claim 1, wherein a level of each of gamma voltages transmitted to the decoder unit through the plurality of common gamma lines is lower than a level of each of gamma voltages transmitted to the decoder unit through the plurality of first gamma lines and the plurality of second gamma lines.

6. The display driving device of claim 1, wherein, when a display panel connected to the plurality of source lines operates in a low power mode, the decoder unit receives the gamma voltages through the plurality of the second gamma lines and the plurality of common gamma lines.

* * * * *